United States Patent [19]
D'Isepo et al.

[11] Patent Number: 5,583,507
[45] Date of Patent: Dec. 10, 1996

[54] PASSIVE IDENTIFICATION OF FRIEND VS. FOE APPARATUS AND METHOD

[75] Inventors: Thomas C. D'Isepo, Orlando; David C. Lai, Altamonte Springs; Donald L. Stiver, Orlando, all of Fla.

[73] Assignee: Martin Marietta Corporation, Bethesda, Md.

[21] Appl. No.: 425,072

[22] Filed: Apr. 19, 1995

[51] Int. Cl.⁶ .......................... G01S 13/78; H01Q 15/00
[52] U.S. Cl. .................................... 342/45; 342/6
[58] Field of Search ..................... 342/6, 45, 51

[56] References Cited

U.S. PATENT DOCUMENTS

| | | | |
|---|---|---|---|
| 2,908,002 | 10/1959 | Van Atta | 342/5 |
| 2,908,904 | 10/1959 | Van Atta et al. | 343/708 |
| 4,099,050 | 7/1978 | Sauermann | 359/169 |
| 4,155,087 | 5/1979 | Okrent | 342/6 |
| 4,347,512 | 8/1982 | Sweeney | 342/6 |
| 4,694,297 | 9/1987 | Sewards | 342/6 |
| 5,001,488 | 3/1991 | Joguet | 342/45 |
| 5,030,807 | 7/1991 | Landt et al. | 342/44 |
| 5,073,780 | 12/1991 | Barley et al. | 342/45 |
| 5,091,636 | 2/1992 | Takada et al. | 235/454 |
| 5,223,837 | 6/1993 | Grossman | 342/45 |
| 5,283,422 | 2/1994 | Storch et al. | 235/437 |

*Primary Examiner*—Daniel T. Pihulic
*Attorney, Agent, or Firm*—Burns, Doane, Swecker & Mathis, L.L.P.

[57] ABSTRACT

A method and apparatus for passive identification includes a series of elements preferably in the form of strips, bars or other geometric shapes, or as dipole antennas made of a material having variable EM retro-reflectivity characteristics. By varying the characteristics of individual elements (i.e. spatial, polarization, frequency response and angular extent of retro-reflection), the elements form an alterable pattern which can be used for identification. The characteristics can be changed remotely, the ability of the device to understand and implement the change being a criterion for identification.

56 Claims, 6 Drawing Sheets

PASSIVE IDENTIFICATION OF FRIEND VS. FOE APPARATUS AND METHOD

BACKGROUND

1. Field of the Invention

The present invention relates-generally to a device for passive identification, and more particularly to a method and apparatus for passive identification which includes a remotely modifiable reflectance pattern which is readable at a distance in fog, smoke, dust, during day and night, and under adverse weather conditions and the like.

2. Description of the Related Art

The generalized problem of identification arises in many applications. In one aspect, for example, it is the separation of authentic articles from counterfeit articles. It also arises in motor vehicle control, and, in the battlefield setting, in the identification of friend vs. foe ("IFF").

In the battlefield environment, it is often very difficult to identify and distinguish allied troops ("friends") from enemies ("foes"). Mistaken identifications of foes as friends as well as friendly fire incidents in which friendly troops are mistakenly identified as enemies can have tragic consequences. Thus, various IFF devices have been proposed which improve identification techniques in the combat environment.

Prior art IFF systems have generally utilized a receiver/ transmitter unit which, upon receipt of a coded request, transmits an identifying coded response. These devices operate on the principle that only friends will be able to reply properly to the request and if no proper reply is received, the vehicle or person can be assumed to be hostile.

U.S. Pat. No. 5,001,488 to Joguet, for example, discloses a battlefield IFF method and system including an IFF interrogator and responder. Each friendly vehicle is equipped with an IFF receiver antenna and an infrared laser which transmits a laser pulse in response to receipt of an IFF interrogation signal.

Prior IFF techniques, however, have had the disadvantage of either requiring the person or object to be identified to radiate a unique electromagnetic (EM) field or that some type of visual or thermal infrared (IR) symbol be recognizable by active or passive devices, such as lasers or thermal IR detection systems. Because radiated EM signals as well as visual and thermal IR symbols are easily detected and duplicated by an aggressor, foe, or fraudulent counterfeit, prior art IFF systems could be easily compromised, thereby greatly increasing the probability of fratricide or fraudulent counterfeit. The usefulness of visual and thermal IR symbols is also limited by distance, fog, smoke, dust, adverse weather conditions, adverse lighting conditions and the like.

There is a need, therefore, for a fail-safe IFF method which allows for the detection, identification, and differentiation of persons, objects or things in the field, which is capable of differentiating between friends and foes at long distances and in fog, dust and under adverse weather conditions, and which cannot be compromised, detected, or understood by an enemy.

The above is but one example of a situation where identification generally and passive identification in particular is a requirement. As mentioned, there are other systems where such a requirement exists, or where a capability for reliable passive identification could provide substantial benefits. These include prevention of credit card fraud, border control applications, covert law enforcement activities including the interdiction of illegal and/or contraband activities, and many more.

SUMMARY

It is an object of the present invention, therefore, to provide a method and apparatus for passive identification which is capable of detecting, identifying, and differentiating persons or objects, which is effective at long distances, during day and night, in fog, smoke, dust, and under adverse weather conditions and the like, and which cannot be compromised.

According to an exemplary embodiment of the invention, a uniquely recognizable material substance can be placed on a person or object to be identified in the form of indicia such as a plurality of strips, bars or other geometric shapes on a surface of the person or object. The material substance of the strips can have an electrical conductivity which is alterable, for example by application of a voltage. By varying the electrical conductivity of the individual strips with a controller electrically connected to the strips, the reflectivity of each strip to incident EM energy can be controlled so that the retro-reflected signals from the device can be identified as a unique spatial pattern. A unique materials formulation and materials process allow the material substance of the strips to be encoded at any time, thereby providing a unique EM signature when irradiated with EM energy.

According to another embodiment of the invention, the indicia can comprise a plurality of dipole antennas. Groups of dipole antennas can be connected with transmission lines to form indicia which reflect incident radiation in a pattern having unique spatial, polarization, angular, and frequency characteristics. The indicia can reflect radiation over a large bandwidth of frequencies, and the retro-reflection can be detected from a wide range of angles with respect to the incident radiation. According to one embodiment of the invention, EM frequencies from 2–100 GHz can be used as the incident radiation for the PIFF apparatus.

A remote transmitter/interrogator can be provided to direct the EM energy to the apparatus and to receive and interpret the unique spatial, polarized, frequency selective, and angular characteristics of the retro-reflective pattern. By coordinating the code patterns to be used, the interrogator can positively identify persons and objects in the field and eliminate the possibility of fraudulent or mistaken identifications.

The ability to quickly change the encoding of the material substance or dipole antenna configuration on persons and objects can preclude any compromise of the unique coded signature. Therefore, for example, an aggressor, intruder, or foe cannot match the code in attempting to misrepresent a hostile person or object as a friend. The retro-reflective strips, bars or other geometric indicia can be embedded in or surrounded by an EM absorbing material formulation. This absorbing material allows the indicia to exhibit unique spatial, polarization, frequency, and angular retro-reflective response patterns by, for example, reducing EM radiation retro-reflected from the absorbing material which might otherwise interfere with the radiation retro-reflected from the indicia. The apparatus can thus be constructed such that no significant polarized retro-reflection is observed from the surrounding absorbing media, but that significant polarized retro-reflection is observed from the indicia.

The method and apparatus according to exemplary embodiments of the present invention has several advantages over prior techniques. For example, the specific encrypted code sequence of the conductive indicia cannot be compromised, as is possible with visual and laser codes which depend on color, geometry, and logos that can be detected and duplicated. Further, the apparatus is passive in nature so that the person or object for which identification is sought does not have to emanate or radiate any type of EM signal, as is the case with existing devices such as aviation IFF devices. An aggressor, foe, or counterfeiter therefore, cannot detect EM signals and duplicate them. The invention also offers the advantage that a third party can survey large areas of a battle or surveillance space to quickly detect and identify persons or objects.

BRIEF DESCRIPTION OF THE DRAWINGS

The foregoing and other objects, features and advantages of the present invention will be more readily understood upon reading the following detailed description in conjunction with the drawings in which.

DETAILED DESCRIPTION

Figure 1:
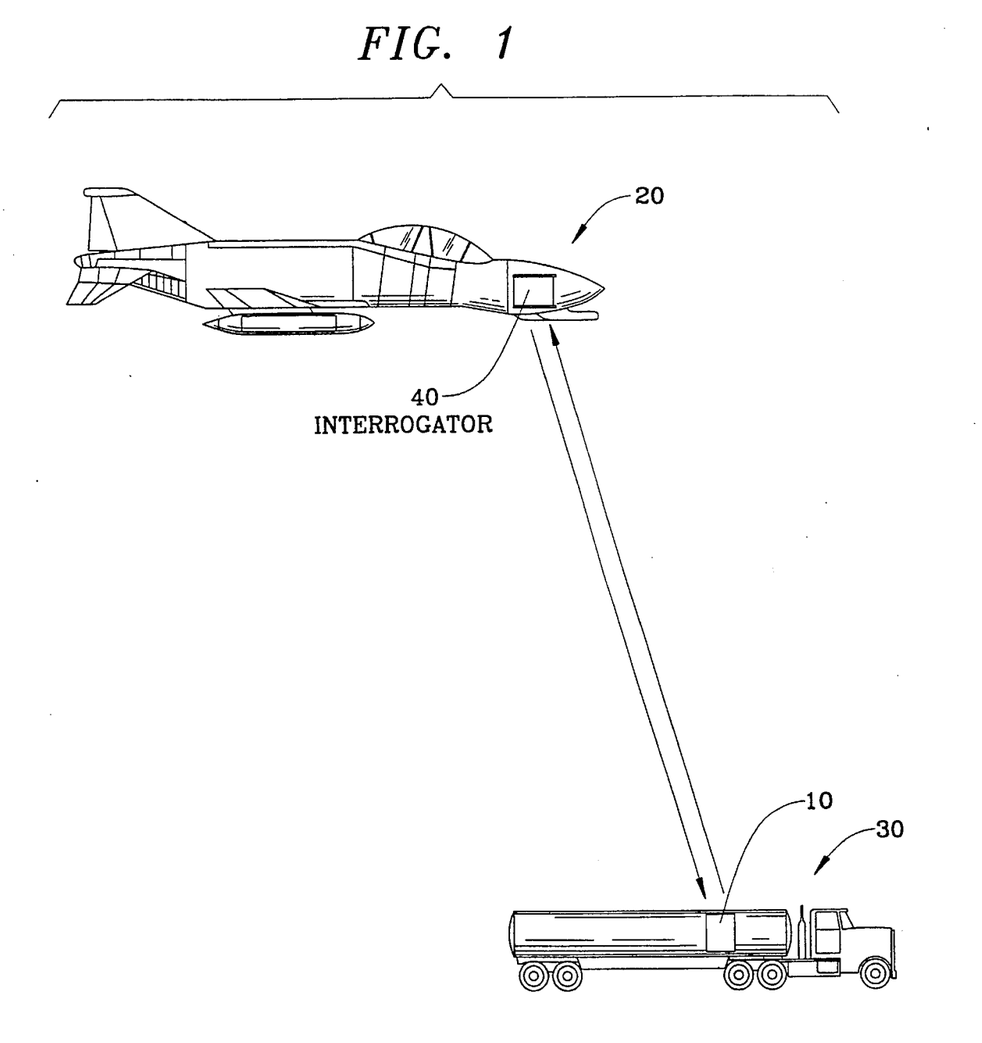
FIG. 1 is an example of the use of an embodiment of the invention as used in a combat environment.

FIG. 1 illustrates an example of the use of a PIFF apparatus 10 in a combat environment where it would be used for passive identification of friend or foe ("PIFF"). An aircraft 20 transmits an EM signal to a land vehicle 30, on which is fixed the PIFF apparatus 10 having indicia which reflect the incident EM energy in a unique spatial pattern. The aircraft 20 is equipped with an interrogator 40 to interpret the reflected spatial pattern to determine whether the land vehicle 30 is a friend or foe. The indicia of the PIFF apparatus 10 can retro-reflect unique polarization and frequency selective characteristics that can be determined, for example, only by a friendly EM source such as the interrogator 40 of the aircraft 20. The indicia can be designed to retro-reflect over a large angular extent with respect to the incident angle of transmitted radiation. Although FIG. 1 shows a single PIFF apparatus 10 disposed on the land vehicle 30, in practice it is generally preferable to fix a plurality of PIFF devices 10 to the land vehicle 30, such as ten or twenty, so as to enable identification of the land vehicle 30 from any angle.

Figure 2:
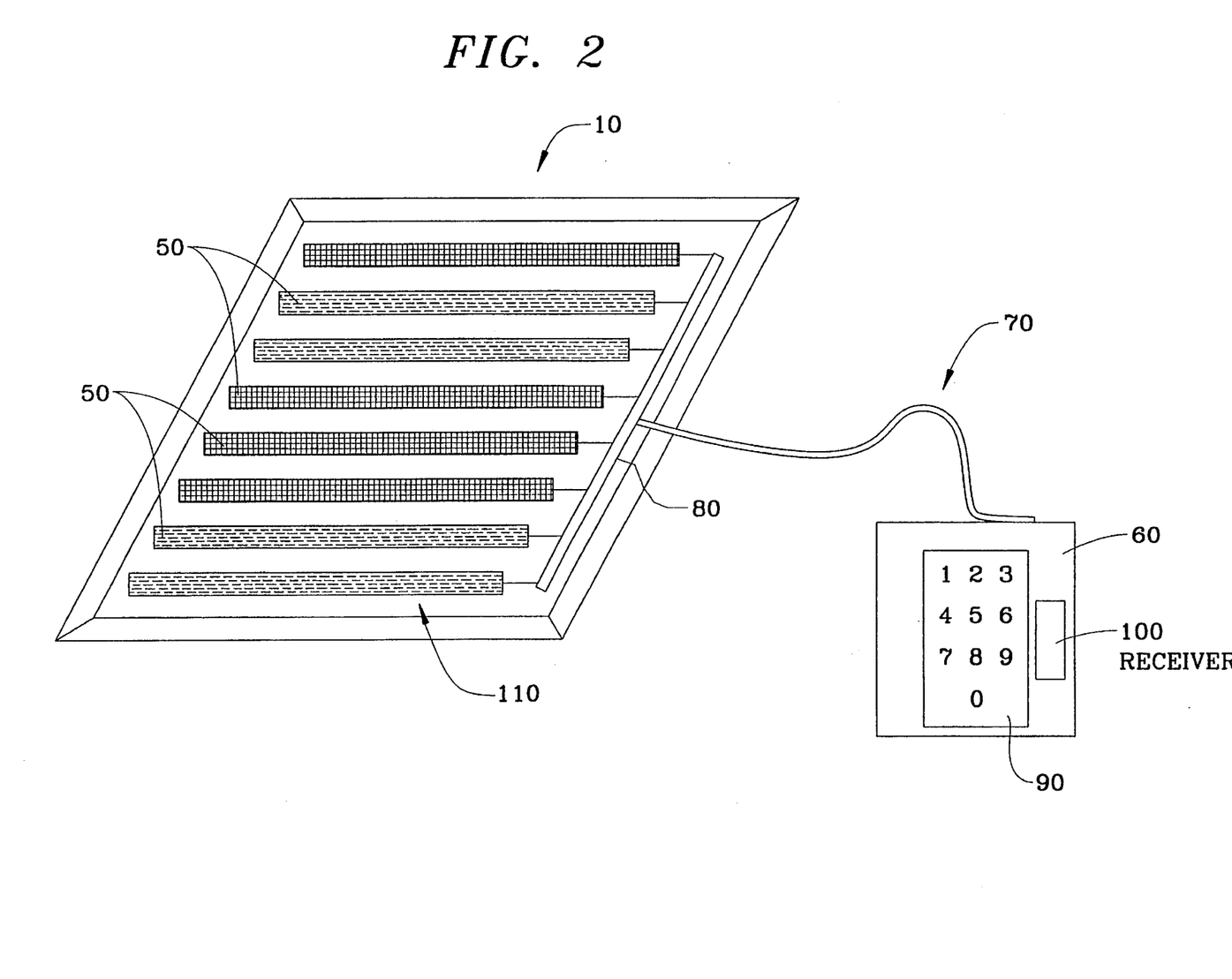
FIG. 2 is a partially diagrammatic perspective view of a first embodiment of the present invention.
Figure 5:
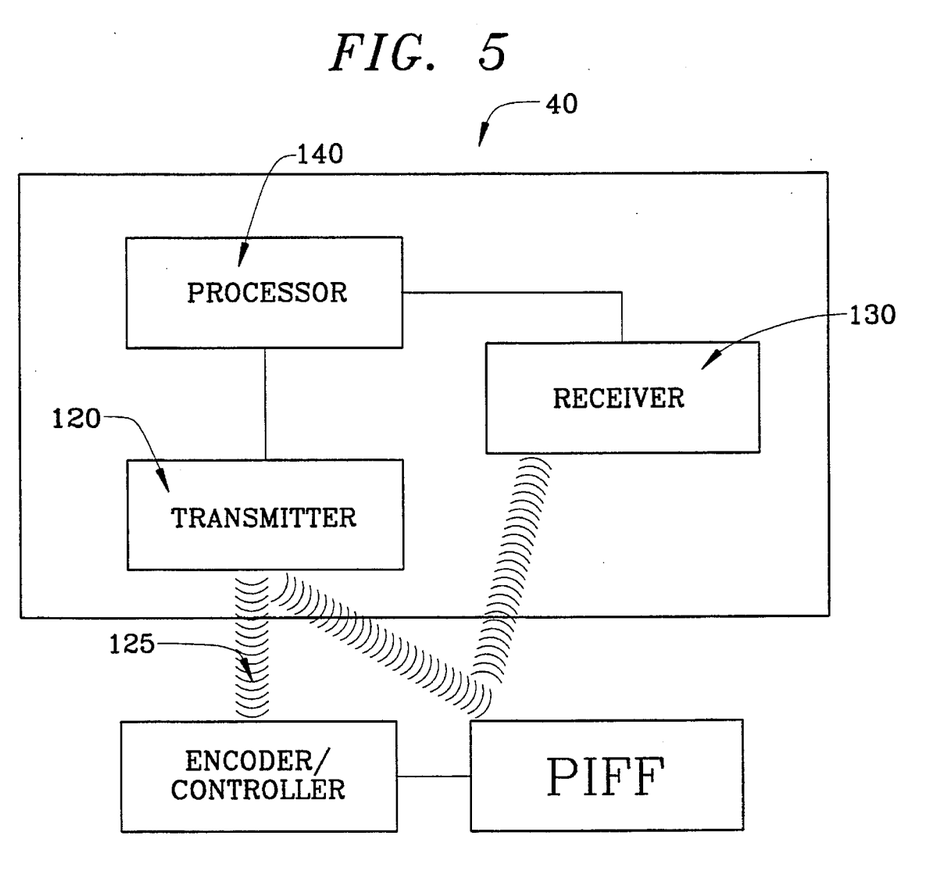
FIG. 5 is a schematic diagram of an interrogating radar system.

FIG. 2 shows a PIFF apparatus 10 according to a first embodiment of the invention. The PIFF apparatus 10 may include a plurality of indicia such as five to ten strips 50. The strips 50 can be arranged substantially parallel to one another to enable a remote interrogator 40, as shown in FIG. 5, to distinguish a bar code pattern of reflected radiation. The spacing and the dimensions of the strips 50 will be dependent upon the frequency, polarization, and spatial resolution of the interrogating radar system 40. The PIFF apparatus 10 can occupy an area of approximately 1–4 square feet.

According to the first embodiment of the invention shown in FIG. 2, the strips or indicia 50 can comprise a conductive polymeric material or composition such as mylar-coated polyphenyl sulphide which is capable of altering its DC conductivity via application of a voltage. The indicia may be formed by the deposition of conductive metal or organic polymers onto a flexible substrate such as mylar. The DC conductivity value of the polymeric material may range from $10^{-2}$ mho/m to $10^4$ mho/m, for example. By altering the DC conductivity of individual strips 50, the reflectivity of the individual strips 50 to incident EM radiation can be altered. The strips can thus form a surface which reflects incident EM radiation in a characteristic spatial pattern which can be changed by altering the voltage applied to each strip 50.

A remote encoder/controller 60 can be provided to control the retro-reflective characteristics of the indicia of the PIFF apparatus by applying a unique voltage to each individual strip 50. The encoder/controller 60 can be electrically connected to each strip 50 via a multi-wire flex cable 70 and an electrical connector bus 80, for example, or by other suitable means. By changing the voltage applied to each strip 50, the controller 60 can alter the reflectivity of individual strips 50 to the incident radiation transmitted by the interrogator 40. The encoder/controller 60 can include a keypad 90 for manually entering a desired code pattern. The encoder/controller 60 can also include a receiver 100 for receiving a remotely transmitted signal indicative of a desired code pattern. Such a signal can be transmitted, for example, by the interrogator 40. Upon receipt of the signal or manual entry of a desired code pattern, the encoder 60, which can also include a microprocessor for directing the changing of codes based on the received input, can change any on/off combination of the strips 50 to a desired pattern by automatically increasing or decreasing the conductivity of individual strips, thereby manipulating the reflectivity of the strips.

Beneath the strips, a radar-absorbing area 110 of preferably 1–4 square feet is coated with a material that absorbs EM energy, for example EM energy in the bandwidth of an EM interrogating radar system. The material coating composition of the radar absorbing area 110 can include EM absorbing species that possess conductive and/or resistive dielectric and/or magnetic characteristics, bound in a sprayable or otherwise easily applied organic resin. Examples of these EM absorbing species include electrically conductive and/or resistive fibers or whiskers, such as steel, nickel, zinc, silicon carbide, and carbon or graphite fibers. The conductive strips 50 thus alter their DC conductivity and EM reflectivity relative to the EM absorbing coated layer 110, which is disposed behind the strips 50.

The entire surface of the PIFF device 10, including the EM absorbing layer 110 and the rectangular conductive strips 50, can be coated with 2–6 mils of an alkyd or similar organic based paint to visually obscure the presence of the PIFF apparatus 10 on the person or object to be identified.

Figure 3:
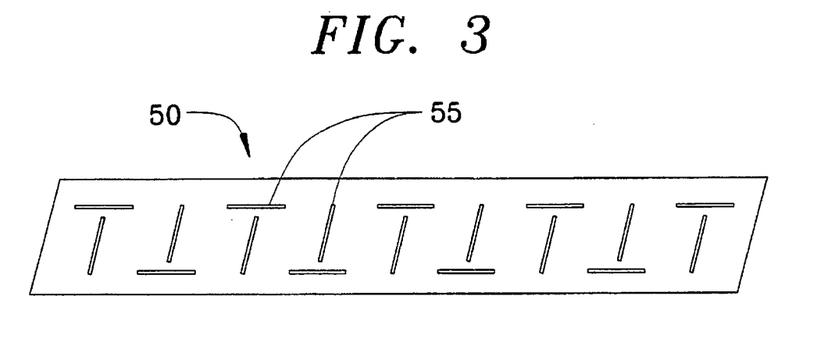
FIG. 3 is a diagrammatic perspective view of a retro-reflective strip having a plurality of dipole antennas according to a second embodiment of the invention.

According to a second embodiment of the invention, the strips 50 of the PIFF apparatus can include a plurality of dipole antennas. U.S. Pat. No. 2,908,002 to Van Alta, for example, the disclosure of which is incorporated by reference, describes the structure and operation of an array of dipole antennas. FIG. 3 shows an enlarged drawing of one of the retro-reflective strips 50 of FIG. 2 in which an array of retro-reflective dipole antennas 55 are employed. In FIG. 3, pairs of dipoles can be connected to one another via a transmission line. Thus, incident EM radiation received at one of the pair of dipole antennas is transmitted to the other dipole antenna through the transmission line and retro-reflected with a different polarization. The dipole antennas can thus provide a retro-reflected signal having certain identifiable polarization characteristics. As in the first embodiment, the reflectivity of each individual strip 50 can be turned on or off by a suitable device, thus creating a unique spatial pattern of retro-reflected EM radiation. This can be accomplished, for example, by making or breaking the electrical connections between the coupled dipole antennas 55 in a particular strip 50.

Figure 4A:
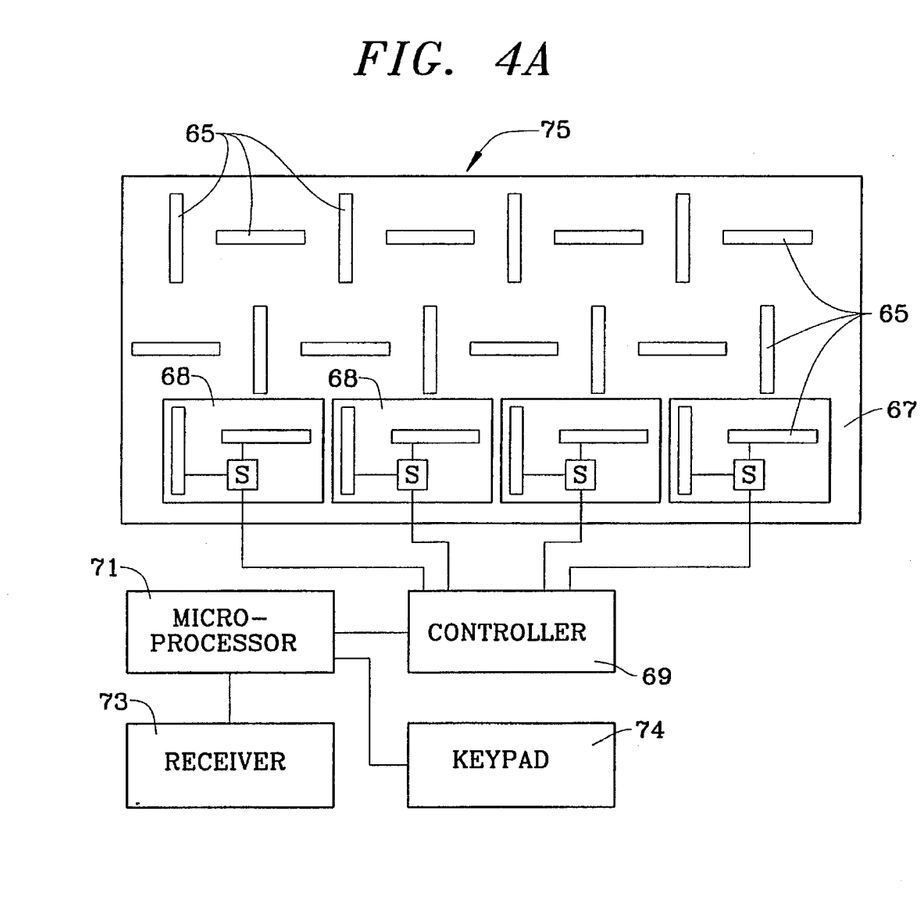
FIGS. 4A and 4B are diagrams of an apparatus comprising an array of dipole antennas according to a third embodiment of the invention.

According to a third embodiment of the invention, the PIFF apparatus can be formed with a plurality of dipole antennas disposed on a substrate such that any combination of antennas can be connected to form a retro-reflective indicia. FIG. 4A, for example, shows twelve pairs of dipole antennas 65 disposed on a substrate. Each antenna 65 can be approximately 3 cm in length, for example. Although twelve pairs of antennas are shown in FIG. 4A, it is also possible to construct the PIFF apparatus 75 with many more dipole antennas, for example 8000, which are smaller in size. This allows for greater flexibility in designing the desired characteristics of the retro-reflected signal.

In order to allow the signals to be effectively reflected by the dipole antenna indicia, the dipole antennas 65 can be embedded in a transparent dielectric material 68 having a suitable impedance. This dielectric material 68 can be a plastic, for example, which is transparent to the incident radiation so as not to interfere with the signal retro-reflected from the antenna 65. The dielectric material 68 should also have an impedance such that it can physically support the antenna 65 without affecting the electrical operation of the antenna 65.

As described above with respect to the first embodiment, the dipole antennas 65 which are embedded in the dielectric material 68 can be disposed on an EM absorptive material 67 which absorbs EM radiation in the bandwidth used by the interrogator 40. The EM absorptive material 67 provides a region surrounding the indicia 65 from which very little EM energy is reflected, thus enabling the interrogator 40 to more accurately decipher the radiation retro-reflected by the indicia 65. As in the first embodiment, the entire surface of the PIFF 75 can also be coated with 2–6 mils of an organic based paint to visually obscure the PIFF on the person or object to be identified.

As shown in FIG. 4A, the dipole antennas 65 can be connected to each other in pairs through a switch S, shown for simplicity on only four pairs of antennas. The switch S can be a conventional solid state switch such as a transistor, or other some other switching device. The switches S preferably would be fabricated along with the dipoles as set forth below. The switches S can be controlled by a remotely controlled control current or voltage. Using the switches S and standard EM transmission line methods, a remotely controlled signal can change the retro-reflectivity of any set of transmission line elements to create a distinct spatial pattern of retro-reflective indicia. A controller 69 driven by a microprocessor 71 can connect and disconnect the antenna pairs from each other which enables or disables the retro-reflection of incident radiation by each antenna 65. The microprocessor 71, which for example would be a suitably programmed microprocessor such as an Intel 486, can receive a signal from a receiver 73 or a keypad 74 which indicates a particular code pattern to be displayed. The microprocessor 71 then determines according to a certain algorithm which switches and connections to activate based on the desired code pattern.

Figure 4B:
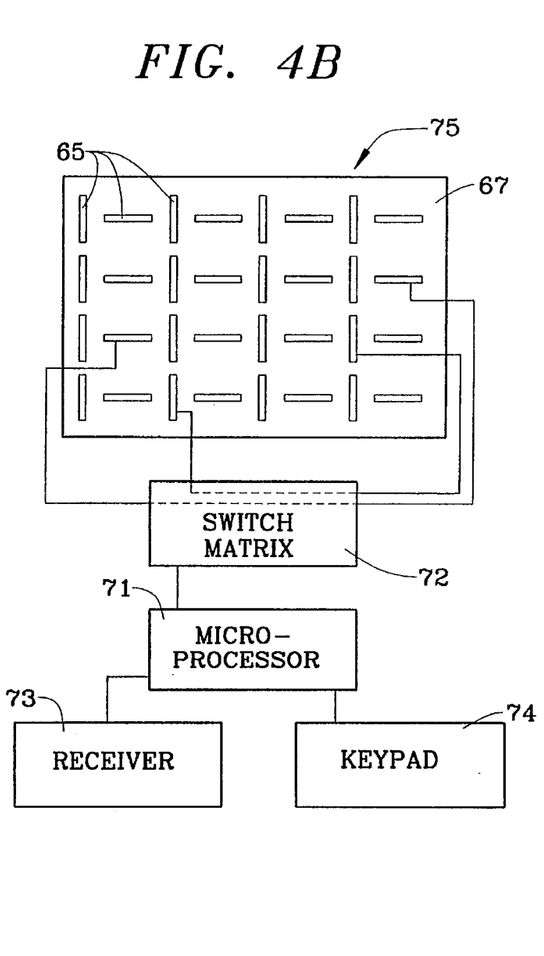

FIG. 4A shows an arrangement which results in cross-pole retro-reflection. For example, a vertical component of an incident electric field is received by a vertically aligned dipole antenna, and is subsequently transmitted through the connected horizontally aligned dipole. Although only certain connections between dipole antennas are shown in FIG. 4A, any other set of connections could be established. The PIFF apparatus 75 can also be constructed with a switch matrix 72, as shown in FIG. 4B, having many additional switches and transmission line elements to enable each antenna 65 to be connected to any other antenna or combination of antennas. For example, a vertical dipole antenna need not be connected to an adjacent horizontal dipole antenna, but instead may be connected to another vertical dipole antenna or a horizontal dipole antenna in another region of the PIFF apparatus, or both. The switch matrix 72 can be controlled by a microprocessor 71 which receives and processes input instructions from the receiver 73 and the keypad 74. Such a switching configuration provides enormous flexibility and specificity in designing the spatial, angular, frequency, and polarization characteristics of the retro-reflected EM radiation. In this fashion, control of the retro-reflection for each reflector element on a transmission line can be achieved with regard to the angle, polarization and frequency response of the reflected signal, which allows for a unique retro-reflected signal code to be achieved.

The ability to connect various combinations of dipole antennas 65 having different orientations allows the PIFF apparatus 75 to control the polarization characteristics of the retro-reflected signal. Further, the ability to connect and activate combinations of antennas in certain discreet regions of the PIFF apparatus allows for control of the angular extent over which retro-reflected signals from the PIFF can be spatially resolved. Frequency relates to the physical size and the transmission line distance between each connected dipole pair. For example, if the PIFF apparatus 75 is aligned such that it receives the interrogating signal at a high angle of incidence, the interrogator may have difficulty in deciphering the retro-reflected signal. The retro-reflective pattern of the PIFF apparatus can accordingly be quickly reconfigured to allow detection by a receiver at lower resolution of the retro-reflected signal. This can be accomplished, for example, by activating dipole antennas 65 which are a greater distance from each other, which enables the interrogator 40 to resolve the retro-reflected signal at a higher angle of incidence.

This capability, combined with the improved response at increased angles of incidence described in the Van Atta patent, results in a PIFF device 75 which can be adapted to effectively retro-reflect radiation over a significant range of angles of incidence. Moreover, such adaptation can be quickly and automatically implemented as will be described below. An interrogator 40 receiving a retro-reflected signal having an unacceptably low amplitude, for example, can automatically instruct the PIFF apparatus to adjust the spatial configuration of its retro-reflective indicia.

The flexibility in designing both polarization characteristics and the spatial relationship between retro-reflective elements is particularly advantageous in adapting the PIFF apparatus for use with different types of radar systems. Thus, when used in conjunction with radar systems having a low resolution, the PIFF apparatus can be configured to activate indicia which are a greater distance apart. The PIFF connections can also be tailored to provide polarization characteristics of the retro-reflected signal which are compatible with the capabilities of the particular interrogator being used. For example, "co-polar" systems send and receive signals having the same horizontal or vertical polarization, while "cross-pole" systems receive signals in which the polarization has been rotated by 90 degrees. The PIFF apparatus can be automatically adapted to retro-reflect signals having characteristics which a particular interrogator is designed to detect.

These exemplary embodiments of the PIFF apparatus can be advantageously constructed using methods disclosed in commonly-owned U.S. patent application Nos. 07/904,688, 07/904,948, and 08/193,660 which are hereby incorporated by reference. These patent applications provide improved methods for fabricating a substantially nonplanar substrate, such as a printed circuit board, a dipole antenna array, or a doubly contoured radome, having a plurality of elements which form a predetermined pattern. The substrate is typically comprised of a polymer layer and a metallized layer that is coated with a photoresist material. An element of the predetermined pattern is then directly imaged into the photoresist material using a mask and a coherent light source. Preferably, the coherent light source includes an excimer laser. The doubly contoured substrate is then displaced relative to the coherent light source. The next element of the pattern is imaged into the photoresist material, and the process of imaging and displacing the substrate is repeated until the pattern is complete. The photoresist material is then developed. The undesired portions of the metallized layer exposed during developing are then etched away using an acid or other suitable technique. In this way, a repeated pattern of dipole antennas, as well as the connecting switches and transmission lines, can be constructed.

Figure 6:
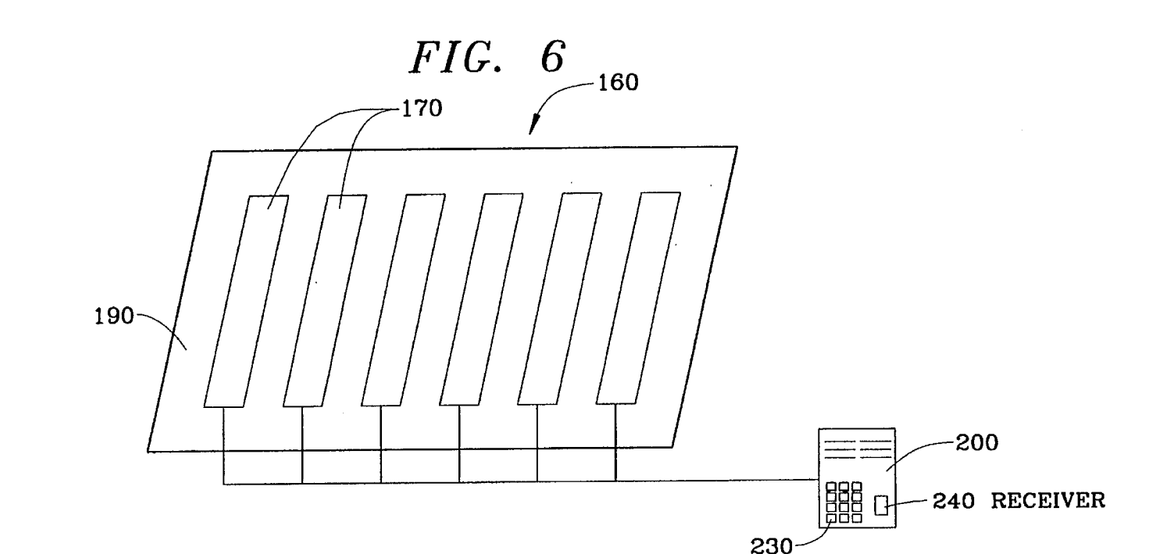
FIG. 6 is a diagram of an apparatus including high temperature superconductors according to a fourth embodiment of the invention.
Figure 7:
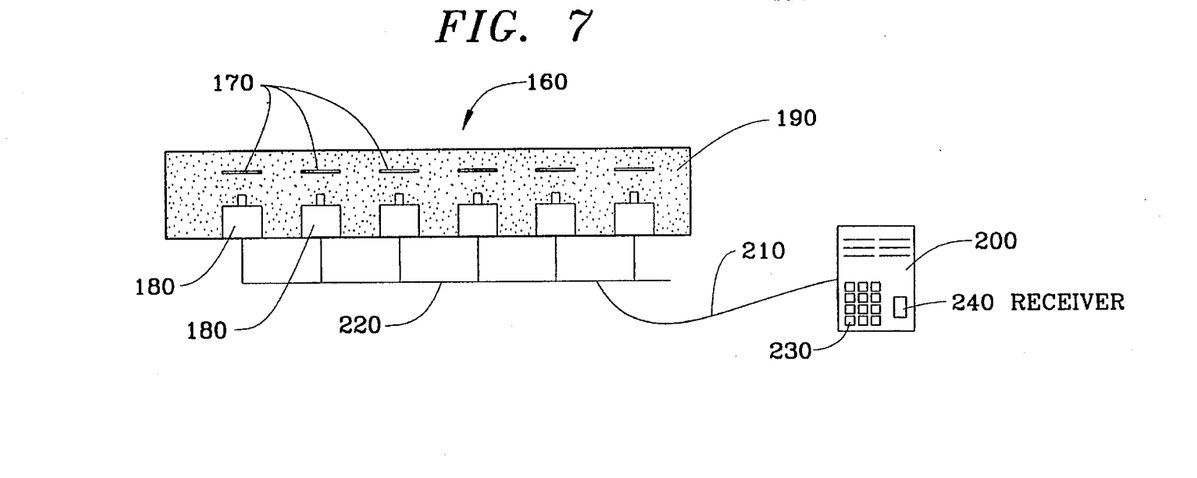
FIG. 7 is a side diagrammatic view of the apparatus of FIG. 6.

According to a fourth embodiment of the invention, as shown in FIGS. 6 and 7, a high temperature superconductor material can be implemented with the PIFF device 160. The fourth embodiment includes conductive strips 170 which may comprise a thin layer of high temperature superconductor material. The thin layer may comprise several bundles of woven high temperature superconductor (HTSC) wire, which create a strip 170 of suitable width and length. Thermal-electric (TE) coolers 180 are preferably placed below each conductive strip 170 and can be embedded in an EM attenuating material 190 having a thickness of 30–100 mils, for example. The TE coolers 180 can be used to change the conductive characteristics of the HTSC material. The HTSC material can be any of a number of inorganic ceramic compositions such as those recently described in the scientific literature which involve complex compounds of aluminum, lithium, zinc, copper oxide, etc. These formulations exhibit superconductive qualities at temperatures greater than 77° K. Thus, each strip 170 can be turned on or off at any time; i.e., each strip will become reflective or non-reflective to the EM energy propagated by the EM interrogating source 40. The HTSC material can also be implemented in conjunction with a dipole antenna arrangement to enable and disable certain configurations of activated antenna groups, which allows for control of the angular, spatial, frequency and polarization characteristics of the retro-reflected radiation.

As in the first embodiment, the TE coolers 170 can be electrically connected to a TE controller/encoder box 200 via a multi-wire flex cable 210 and an electrical connector bus 220, for example, or by other suitable means. The TE controller/encoder box 200 can include a keypad 230 and a receiver 240 for receiving a desired code pattern and a microprocessor for controlling the changing of codes.

Figure 8:
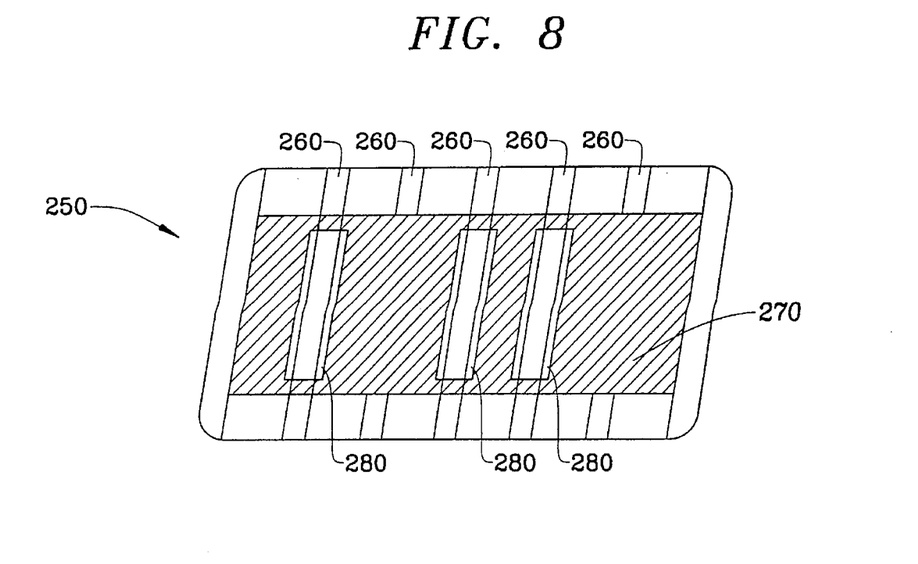
FIG. 8 is a perspective view of an apparatus including a belt mechanism according to a fifth embodiment of the invention.
Figure 9:
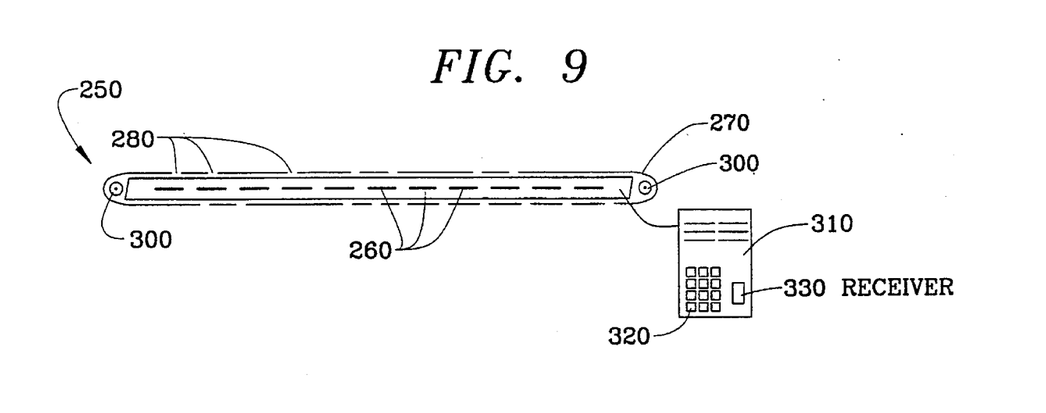
FIG. 9 is a side view of the apparatus of FIG. 8.

According to a fifth embodiment of the invention, a slotted, treadmill-like device or belted apparatus 250 can be used as the means by which different conductive strips 260 are exposed or made visible to the EM interrogating source 40. As shown in FIGS. 8 and 9, an EM attenuating material having a thickness of approximately 10–30 mils can be formed into a wide belt 270. The belt 270 may be constructed, for example, by impregnating several woven layers of E-glass or S-2 glass with the aforementioned fiber or whisker absorbing species. The woven fabric layers can then be fashioned into a belt which is coated with an organic elastomer, such as a Viton fluoroelastomer. The fluoroelastomer can be applied at an appropriate thickness to assure good durability to the rotating belt.

The belt 270 can have aperiodic, rectangular sections 280 cut out of its mid-section, thereby exposing the desired conductive strips 260 as the belt 270 passes over the top of the strips. FIG. 8, for example, shows a cut-away view of the belt 270 which completely covers two of the five conductive strips 260 shown, making them invisible to the interrogator 40. FIG. 9 shows a side view of the belted apparatus 250, including a panel of indicia 260 and rollers 300 over which the belt 270 slides. The belt 270 can be remotely controlled by a controller 310 which can include a keypad 320, a receiver 330, and a microprocessor, or which can be manually rotated such that the cut-out rectangular sections 280 are positioned over any desired conductive strip 260, thereby creating a unique reflective code. The strips 260 can be of the type shown in FIGS. 2 or 3, for example.

Figure 10:
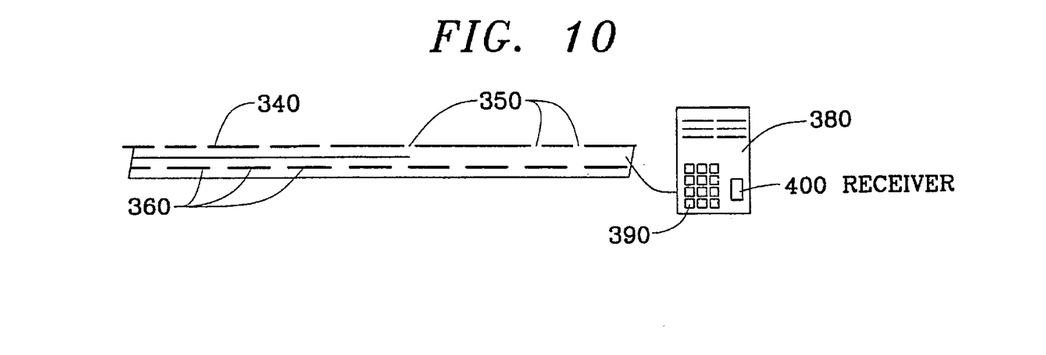
FIG. 10 is a side view of an apparatus including a sliding panel according to a sixth embodiment of the invention.

FIG. 10 shows a sixth embodiment of the invention, including a single sliding sheet 340 of EM attenuating material, also having aperiodic, rectangular sections 350 cut out of its mid-section. The sheet 340 can be a rigid, sliding, slotted panel and can be manually translated across the panel of conducting strips 360 or remotely controlled via a controller 380 which can include a keypad 390 and a receiver 400. For remote control of the sliding sheet 340, the interrogator 40 can utilize a side band frequency signal to provide instructions to the remote encoder/controller 380 via receiver 400, as described above. The strips 360 can be of the type shown in FIGS. 2 or 3, for example. Thus, a manual or automatic method of exposing different strips 360 is provided, thereby creating a retro-reflected code having unique spatial, polarization, frequency, and angular extent characteristics.

During the operation of the various embodiments, the PIFF apparatus is read by the remote interrogator 40, as shown in FIG. 5, which may include a transmitter 120 for transmitting EM energy to the PIFF apparatus and a receiver 130 for receiving the EM energy retro-reflected by the indicia of the PIFF apparatus. This friendly retro-reflective source 40 can be located at any distance from the person or object to be identified, given that sufficient radiating power exists to transmit energy to and receive energy from the indicia.

The interrogator 40 preferably transmits EM radiation in a broad bandwidth comprising a central frequency sandwiched between two large bandwidths of, for example 500 MHz. A large frequency bandwidth allows for a greater spatial resolution by the interrogator according to the following formula:

$$SR = c/f$$

where SR is the spatial resolution in meters, c is the speed of light in meters per second, and f is the frequency bandwidth in hertz (1/seconds). The total bandwidth can be divided into a plurality of smaller frequency bands, for example 64 bands on each side of the central frequency, which are simultaneously transmitted to the PIFF apparatus and individually analyzed after being retro-reflected. According to one embodiment, the interrogator 40 can operate in the 2–100 GHz frequency range. Those of ordinary skill in the art will readily appreciate, however, that the present invention can be implemented using a variety of frequency bandwidths. The interrogator 40 can use a laser radar system, for example, to achieve high spatial resolution.

The interrogator 40 is preferably a polarimetric interrogator which can transmit and receive elliptically polarized EM radiation having both vertical and horizontal polarization characteristics. As described above, however, an advantageous feature of the PIFF apparatus is that it can be quickly configured to be compatible with many different types of interrogators and radar systems, such as doppler radar, spatial resolution radar, range radar, and cross- and co-pole systems.

The interrogator 40 can include a processor 140 which operates according to specific algorithms to enable the interrogator 40 to decipher spatial, frequency and polarization attributes of the indicia and decode the encryption. Initially, any Doppler shift can be translated into the spatial domain using a Fourier transform. In addition to the translation of any Doppler signals, an algorithm suite, operating in the processor 140, can identify unique polarization and frequency characteristics of each retro-reflected signal from the pattern of retro-reflective indicia. The polarization characteristics of the retro-reflected signal from each indicia can be resolved into vertical and horizontal components, for example, according to a Jones matrix. Only the indicia that have been rendered retro-reflective to EM radiation would be identified by the interrogator 40. The receiver 130 is capable of isolating a single frequency or a band of frequencies retro-reflected as a set of signals from the indicia. The polarization and frequency decoding of the encryption can be accomplished because the interrogator 40 simultaneously transmits a broad bandwidth of frequencies that are elliptically polarized. The received retro-reflected signal data, which are in the frequency domain, can be transformed to the spatial domain using a Fourier transform to determine the spatial alignment of the indicia. This can be achieved regardless of the angle of incidence of the radiation on the PIFF apparatus.

In designing the connecting hardware between dipole antennas, it is important to consider the impedance of the indicia. It is often desirable to manipulate the impedance of the connected dipole antenna configurations so that the interrogator is able to effectively receive and decipher the retro-reflected signals from the activated dipole antenna configurations. This can be achieved by adjusting the path length of the transmission line connecting each dipole antenna pair.

According to a preferred embodiment of the invention, the interrogating radar system 40 can have full knowledge of and direct the changing of code sequences to assure that all friendly persons, objects or things have simultaneously changed their codes. The PIFF apparatus 10, is preferably implemented in a cooperative system in which there is a request by the interrogator 40 to change a code, and a confirmation received by the interrogator 40 that the code has been changed. The encoder/controller of the PIFF apparatus can automatically change the code based on the request from the interrogator, for example if manual code changing is not possible. Automatic changing of the code can be affected by transmitting a side band signal 125, containing a new code, from the interrogator 40 directly to the receiver of the remote encoder/controller. The interrogator 40 can then interrogate the PIFF apparatus to determine that the proper code changes have been achieved. If more than one PIFF apparatus is fixed upon a particular person or object, the remote encoder/controller should simultaneously change the code in each such PIFF apparatus.

The side band signal 125 can be, for example, one frequency band from the total bandwidth of frequencies transmitted by the transmitter 120 of interrogator 40 to the remote encoder/controller and PIFF apparatus. The transmitted side band signal 125 carries information to direct changes to the strips or indicia regarding the desired retro-reflective characteristics of frequency, polarization, direction, and spatial pattern. The side band signal 125 can also advantageously carry information which identifies the particular interrogator 40 being used and/or its operating characteristics. This information allows the encoder/controller of the PIFF device to automatically select retro-reflective configurations which are compatible with the particular interrogator 40.

Exemplary embodiments of the invention can provide added security to the PIFF code through the use of a frequency hopping scheme for the side band signal 125. Thus, the side band signal 125 which is utilized to inform the encoder/controller of the desired code can hop between any of the frequencies transmitted by the interrogator 40. Both the remote encoder/controller and the interrogator can be programmed to follow the same frequency hop sequence for the side band signal. The frequency hop sequence can be varied in an unpredictable manner so as to virtually eliminate any possibility of an enemy intercepting the side band signal.

The changing of the pattern of reflective indicia provides an encrypted code that is recognizable only by a friendly EM interrogating radiating source 40. The means by which the coded expression is discernible from physical possession of the PIFF apparatus by a foe is through the understanding and knowledge of the code that is set. The operation of the PIFF apparatus can be understood by a foe or competitor; however, the knowledge of the encryption methodology by which the code is generated cannot be compromised. The encryption methodology can thus can be used to provide fail-safe identification of desired persons and objects in the field.

It will be appreciated that the present invention finds application in a variety of environments for various functions, including: battlefield combat identification methods that preclude or significantly reduce fratricide during ground-to-ground, air-to-air, or naval operations; minimization or elimination of fratricide during covert law enforcement operations where friendly persons or objects are undercover and dispersed amongst enemy or criminal forces or groups; civil/commercial marine and aviation differentiation from intruder aircraft or marine entities conducting criminal activities; elimination of commercial/industrial credit card fraud through the provision of a unique, changeable personal identification code which is undetectable by others; and physical protection of facilities against ingress or egress of unfriendly or foreign persons or objects.

The above-described exemplary embodiments are intended to be illustrative in all respects, rather than restrictive, of the present invention. Thus, the present invention is capable of many variations in detailed implementation that can be derived from the description contained herein by a person of ordinary skill in the art. All such variations and modifications are considered to be within the scope and spirit of the present invention as defined by the following claims.

What is claimed is:

1. An apparatus comprising:
    a substrate;
    a plurality of indicia disposed on said substrate; and
    a controller electrically connected to the plurality of indicia for individually altering an interaction of at least one of said indicia with incident electromagnetic radiation.

2. An apparatus as claimed in claim 1 wherein said indicia have an alterable EM reflectivity, and wherein said controller alters the EM reflectivity of at least one of said indicia.

3. An apparatus comprising:
    a substrate;
    a plurality of indicia disposed on said substrate, each of said indicia comprising a first material having an alterable EM reflectivity; and
    a controller electrically connected to the indicia for altering the EM reflectivity of at least one of the indicia.

4. The apparatus of claim 3, wherein the first material has an alterable electrical conductivity, and wherein the controller alters the EM reflectivity of at least one of the indicia by individually altering the electrical conductivity of said at least one of the indicia.

5. The apparatus of claim 3, wherein said indicia are in the form of strips arranged on said substrate so as to form a bar code pattern.

6. The apparatus of claim 3, wherein said substrate is coated with a second material which absorbs EM energy.

7. The apparatus of claim 6, wherein the plurality of indicia and the second material are coated with a third material which visually obscures the plurality of indicia and the second material.

8. The apparatus of claim 3, wherein the first material comprises a conductive polymer.

9. The apparatus of claim 3, wherein the first material comprises polyphenyl sulphide.

10. The apparatus of claim 3, wherein the controller selectably applies a voltage to the plurality of indicia so as to alter the reflectivity of at least one of the indicia.

11. The apparatus of claim 3, wherein the conductivity of the indicia ranges from about $10^{-2}$ to about $10^4$ mho/m.

12. The apparatus of claim 3, wherein the controller further comprises means for receiving a signal indicative of a pattern to be formed by said indicia and for causing said indicia to form said pattern.

13. The apparatus of claim 3, wherein the controller further comprises means for manually entering a pattern to be formed by the indicia.

14. An identification apparatus comprising:
    an interrogator for transmitting and receiving electromagnetic radiation;
    a control signal generator;
    a reflector, including a plurality of alterably reflective elements, for reflecting in a predetermined pattern at least a portion of incident electromagnetic radiation transmitted by the interrogator; and
    a controller electrically connected to the alterably reflective elements for altering the reflectivity of at least one of the alterably reflective elements based on a control signal received from the control signal generator.

15. An identification apparatus as claimed in claim 14 wherein
    said interrogator is for transmitting and receiving EM radiation,
    said reflector is for reflecting in a predetermined pattern at least a portion of incident EM radiation transmitted by the interrogator, and
    said controller individually alters the EM reflectivity of the alterably reflective elements based on said control signal.

16. An identification apparatus as claimed in claim 14, wherein said control signal generator is physically proximate to said controller.

17. The identification apparatus of claim 14, wherein the control signal generator comprises a keypad for manually entering a pattern to be formed by the reflector.

18. An identification apparatus as claimed in claim 14, wherein said control signal generator is physically remote from said controller.

19. The identification apparatus of claim 14, wherein the controller includes a receiver for said receiving said control signal.

20. The identification apparatus of claim 14, wherein the interrogator is adapted to receive and distinguish a pattern of EM energy reflected by the reflector so as to verify the identity of an object to which the reflector is attached.

21. An identification apparatus comprising:
    a number of indicia arranged on a surface, each of said indicia comprising a superconducting material having an alterable electrical conductivity;
    a like number of thermo-electric coolers each respectively disposed beneath an associated one of said number of indicia for altering the conductivity of the superconducting material; and
    a controller for controlling the thermo-electric coolers to individually alter the reflectivity of each of the strips to incident electromagnetic energy.

22. The apparatus of claim 21, wherein the each of the indicia comprises woven high temperature superconductor wire and is disposed in an EM absorbing material.

23. The identification apparatus of claim 21, wherein the controller includes a keypad for manually entering a pattern to be formed by the indicia.

24. The identification apparatus of claim 21, wherein the controller includes a receiver for receiving a signal indicative of a pattern to be formed by the indicia.

25. An identification apparatus comprising:
    a plurality of elements which reflect incident EM energy; and
    covering means for covering a first portion of at least one of the elements to prevent said first portion from reflecting incident EM energy, said covering means comprising an EM absorbing member having a pattern of openings through which second portions of the elements are exposed to incident EM energy, said member being movable with respect to said elements so as to alter the pattern of exposed second portions of said elements.

26. An identification apparatus as claimed in claim 25, wherein said movable member is in the form of a belt.

27. The identification apparatus of claim 25, further comprising a controller, electrically connected to the identification apparatus for automatically moving said member.

28. The identification apparatus of claim 27, wherein the controller includes a keypad for manually entering data indicative of a pattern to be formed by the elements.

29. The identification apparatus of claim 27, wherein the controller includes a receiver for receiving a signal indicative of a pattern to be formed by the elements.

30. The identification apparatus of claim 26, wherein the belt is adapted to be manually rotatable.

31. An identification apparatus comprising:
a plurality of elements for reflecting incident EM energy; and
covering means for covering a first portion of at least one of the elements to prevent the first portion from reflecting incident EM energy, said covering means comprising an EM absorbing sheet having a pattern of openings to expose portions of said elements, the sheet being slidably mounted with respect to the elements so as to alter an exposure pattern of said reflective elements.

32. The identification apparatus of claim 31 further comprising a controller, electrically connected to the identification apparatus, for automatically sliding the sheet.

33. The identification apparatus of claim 32, wherein the controller includes a keypad for manually entering data indicative of a pattern to be formed by the elements.

34. The identification apparatus of claim 32, wherein the controller includes a receiver for receiving a signal indicative of a pattern to be formed by the elements.

35. The identification apparatus of claim 31, wherein the sheet is adapted to be manually translatable across the elements.

36. A method for identification comprising the step of:
reflecting incident EM energy in a predetermined pattern of substantially parallel strips, wherein the pattern can be changed according to a remote signal by altering the electrical conductivity of the strips.

37. A method for identification comprising the steps of:
altering a reflectance pattern of a plurality of reflecting elements to coincide with a predetermined pattern; and
analyzing EM radiation reflected by said plurality of reflecting elements to determine whether said reflectance pattern of said plurality of reflecting elements coincides with said predetermined pattern.

38. A method for identification comprising the steps of:
transmitting a signal indicative of a predetermined reflectance pattern to be assumed by a plurality of reflecting elements; and
analyzing EM radiation reflected by said plurality of reflecting elements to determine whether an actual reflectance pattern coincides with said predetermined reflectance pattern.

39. An identification apparatus comprising:
voltage applying means; and
a plurality of elements on a surface, said elements being connected to said voltage applying means and comprising a material having an alterable electrical conductivity, wherein a voltage applied to the elements by the voltage applying means changes the electrical conductivity of the elements and the reflectivity of the elements to incident EM energy.

40. A process comprising the step of varying the EM reflectance of a plurality of indicia arranged on a surface.

41. The process of claim 40 further comprising the steps, after said varying step, of
transmitting EM energy at said indicia;
receiving EM energy reflected by said indicia; and
analyzing the received EM energy to determine whether a pattern of EM reflectance of said indicia matches a predetermined pattern.

42. Apparatus comprising:
means for varying the EM reflectance of a plurality of indicia arranged on a surface;
means for transmitting EM energy at said indicia;
means for receiving EM energy reflected by said indicia; and
means for analyzing the received EM energy to determine whether a pattern of EM reflectance of said indicia matches a predetermined pattern.

43. An identification apparatus comprising:
a plurality of indicia which interact with incident EM radiation to produce a retro-reflected signal, wherein the indicia selectably control at least one of a polarization and a spatial pattern of the retro-reflected signal.

44. The identification apparatus of claim 43, wherein one of the indicia comprises at least two dipole antennas electrically connected with a transmission line.

45. The identification apparatus of claim 44, further comprising means for selectively connecting different combinations of dipole antennas with a transmission line.

46. The identification apparatus of claim 45, wherein the connecting means comprises:
a receiver for receiving a signal indicative of a desired retro-reflective pattern; and
a controller for altering the electrical connections between the dipole antennas based on the received signal.

47. The identification apparatus of claim 45, wherein the connecting means comprises:
a receiver for receiving a signal indicative of a desired retro-reflective pattern; and
a switch matrix for altering the electrical connections between the dipole antennas based on the received signal.

48. An identification apparatus comprising:
an interrogator for transmitting and receiving electromagnetic radiation and for transmitting a control signal;
a reflector, including a plurality of indicia, for reflecting at least a portion of incident electromagnetic radiation transmitted by the interrogator, wherein the indicia selectably control at least one of a polarization, a spatial pattern, and a frequency of the reflected electromagnetic radiation; and
a controller, electrically connected to the indicia, for altering at least one of the polarization, the spatial pattern, and the frequency of electromagnetic radiation reflected by the indicia based on the control signal received from the interrogator.

49. The identification apparatus of claim 48, wherein the indicia comprise at least two dipole antennas electrically connected by a transmission line.

50. The identification apparatus of claim 48, wherein the control signal changes in frequency according to a predetermined frequency hop sequence.

51. The identification apparatus of claim 25, wherein the plurality of elements control at least one of a polarization and a frequency of reflected EM energy.

52. The identification apparatus of claim 25, wherein each of the elements comprises a plurality of dipole antennas.

53. An identification method comprising the steps of:
transmitting a signal representative of a first frequency bandwidth;
transmitting incident radiation having a second frequency bandwidth; and
reflecting a portion of the incident radiation in the first frequency bandwidth.

54. The identification method of claim 53, wherein the second frequency bandwidth is 2–100 GHz.

55. An identification method comprising the steps of:

transmitting a signal representative of a first polarization state;

transmitting incident radiation having a second polarization state; and reflecting the incident radiation according to the first polarization state.

56. The apparatus of claim 1, wherein the substrate and the plurality of indicia define a surface which conforms to a surface of an article to be identified.

* * * * *